(12) United States Patent
Pau

(10) Patent No.: US 11,561,084 B2
(45) Date of Patent: Jan. 24, 2023

(54) POLARIZATION SENSITIVE DEVICES, METHODS AND APPLICATIONS

(71) Applicant: Arizona Board of Regents on Behalf of the University of Arizona, Tucson, AZ (US)

(72) Inventor: Stanley Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 636 days.

(21) Appl. No.: 16/606,426

(22) PCT Filed: Apr. 13, 2018

(86) PCT No.: PCT/US2018/027466
§ 371 (c)(1),
(2) Date: Oct. 18, 2019

(87) PCT Pub. No.: WO2018/194920
PCT Pub. Date: Oct. 25, 2018

(65) Prior Publication Data
US 2020/0182988 A1    Jun. 11, 2020

Related U.S. Application Data

(60) Provisional application No. 62/487,037, filed on Apr. 19, 2017.

(51) Int. Cl.
*G01S 7/499* (2006.01)
*G01S 7/481* (2006.01)
(Continued)

(52) U.S. Cl.
CPC .......... *G01B 11/026* (2013.01); *G01S 7/4814* (2013.01); *G01S 7/499* (2013.01); *G01S 17/894* (2020.01); *G02F 1/0136* (2013.01)

(58) Field of Classification Search
CPC ... G01B 11/026; G01S 17/894; G01S 7/4814; G01S 7/499; G02F 1/0136
See application file for complete search history.

(56) References Cited

U.S. PATENT DOCUMENTS

2010/0128109 A1* 5/2010 Banks ............... G01S 17/894
348/46
2010/0234704 A1* 9/2010 Cameron ............ G01N 21/23
600/319

(Continued)

OTHER PUBLICATIONS

International Search Report and Written Opinion for International Patent Application No. PCT/US18/27466, dated Jun. 29, 2018 (12 pages).

*Primary Examiner* — Jamil Ahmed
(74) *Attorney, Agent, or Firm* — Perkins Coie LLP

(57) ABSTRACT

Methods, devices and systems provide improved detection, sensing and identification of objects using modulated polarized beams. An example polarization sensitive device includes an illumination source, and a modulator coupled to the illumination source to produce output beams in which polarization states or polarization parameters of the output beams are modulated to produce a plurality of modulated polarized beams. The device further includes a polarization sensitive detector positioned to receive a reflected portion of modulated polarized beams after reflection from an object and to produce information that is indicative of modulation and polarization states of the received beams. The information can be used to enable a determination of a distance between the polarization sensitive device and the object, or a determination of a polarization-specific characteristic of the object.

24 Claims, 12 Drawing Sheets

(51) Int. Cl.
  *G01S 17/894* (2020.01)
  *G02F 1/01* (2006.01)
  *G01B 11/02* (2006.01)

(56) References Cited

U.S. PATENT DOCUMENTS

| | | |
|---|---|---|
| 2014/0071456 A1 | 3/2014 | Podoleanu et al. |
| 2014/0285812 A1 | 9/2014 | Levitz |
| 2014/0291480 A1 | 10/2014 | Bruder et al. |
| 2016/0153904 A1 | 6/2016 | Mukoh et al. |
| 2016/0178823 A1 | 6/2016 | Gupta |
| 2016/0187471 A1* | 6/2016 | Fendt ................. G01S 7/484 356/5.01 |

* cited by examiner

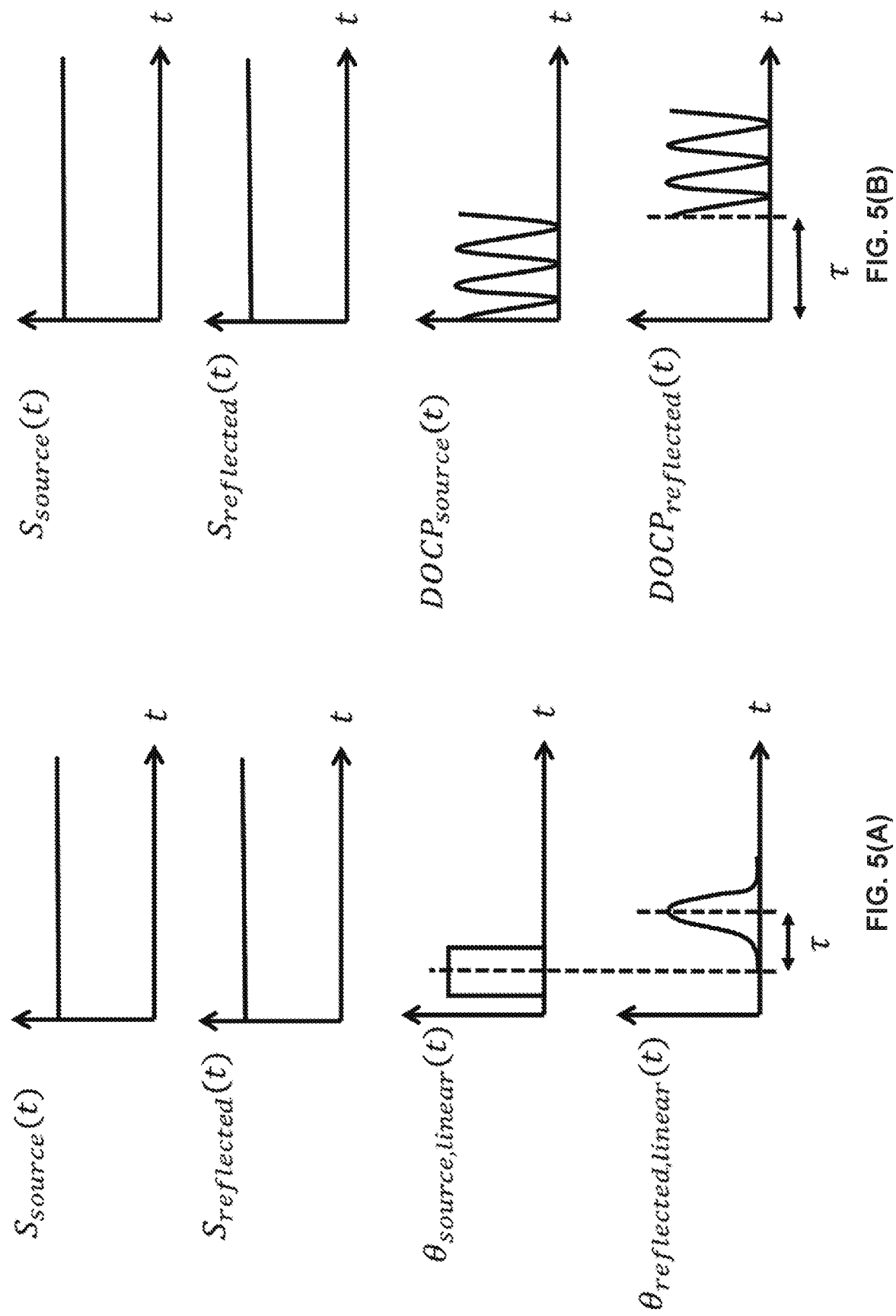

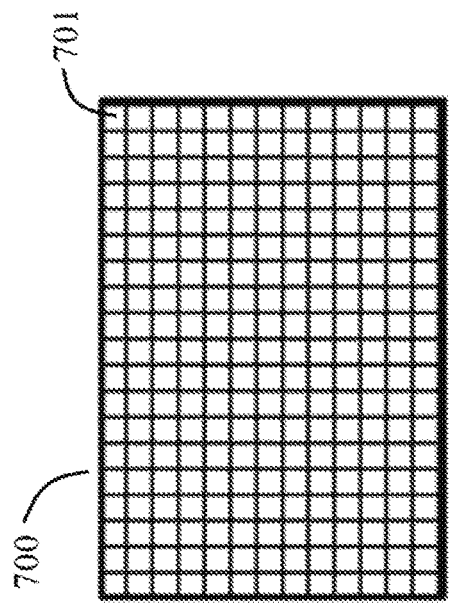
FIG. 7(A)
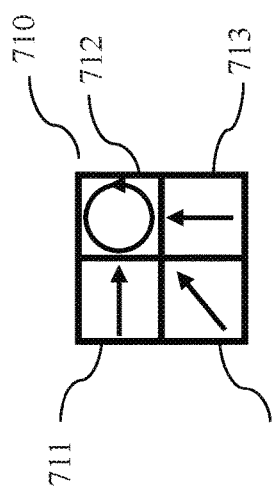
FIG. 7(B)
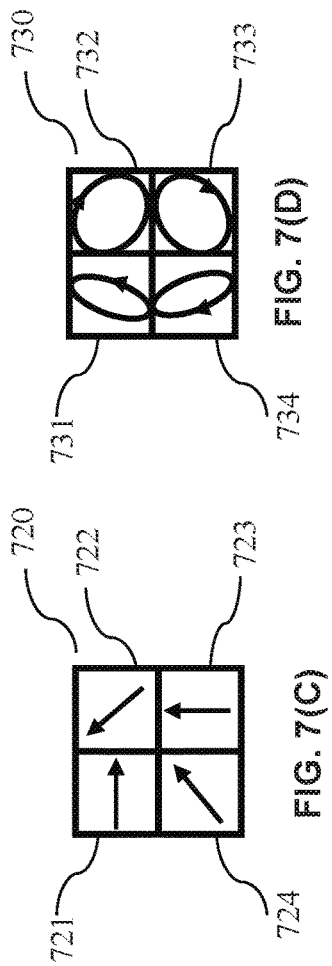
FIG. 7(C)
FIG. 7(D)
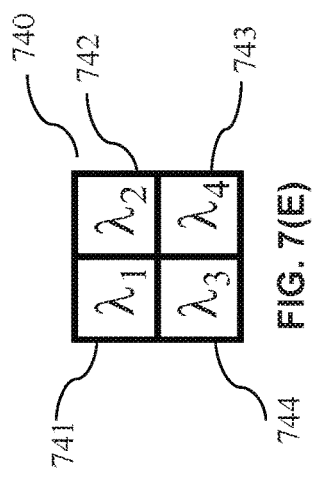
FIG. 7(E)

POLARIZATION SENSITIVE DEVICES, METHODS AND APPLICATIONS

CROSS REFERENCE TO RELATED APPLICATIONS

This patent document is a 371 National Phase Application of International Patent Application No. PCT/US2018/027466, filed Apr. 13, 2018, which claims priority to the provisional application with Ser. No. 62/487,037, titled "Optical Imaging Sensor Apparatus, Methods and Applications," filed Apr. 19, 2017. The entire contents of the above noted applications are incorporated by reference as part of the disclosure of this document.

TECHNICAL FIELD

The subject matter of this patent document relates to optical sensing and imaging, and specifically to the use of polarization techniques to improve detection and sensing.

BACKGROUND

Optical detection and sensing techniques find applications in a variety of fields, including 3-dimensional imaging, metrology, navigation, medical imaging and diagnosis, microscopy and many more. In active illumination systems, a light source is used to illuminate an object of interest, and a detector or sensor receives the reflected light to perform detection and sensing. These systems may use different types of light sources, having different spectral bands or intensities. In some systems, the light source can have a particular polarization, which is detected upon reflection from the object. The use of polarized light can provide additional information about the object or the scene to augment the information obtained based on non-polarized illumination. The disclosed embodiments provide improved methods and devices for detection and sensing that utilize polarized light sources.

BRIEF DESCRIPTION OF THE DRAWINGS

FIG. 5(A) illustrates plots corresponding to the transmitted and received intensity and modulated angles of linear polarization in accordance with an exemplary embodiment.

FIG. 5(B) illustrates plots corresponding to the transmitted and received intensity and modulated degree of circular polarization in accordance with an exemplary embodiment.

FIG. 7(A) illustrates a rectangular detector array in accordance with an exemplary embodiment.

FIG. 7(B) illustrates a first two-by-two detector sub-array in accordance with an exemplary embodiment.

FIG. 7(C) illustrates a second two-by-two detector sub-array in accordance with an exemplary embodiment.

FIG. 7(D) illustrates a third two-by-two detector sub-array in accordance with an exemplary embodiment.

FIG. 7(E) illustrates a fourth two-by-two detector sub-array in accordance with an exemplary embodiment.

SUMMARY OF CERTAIN EMBODIMENTS

Figure 1:
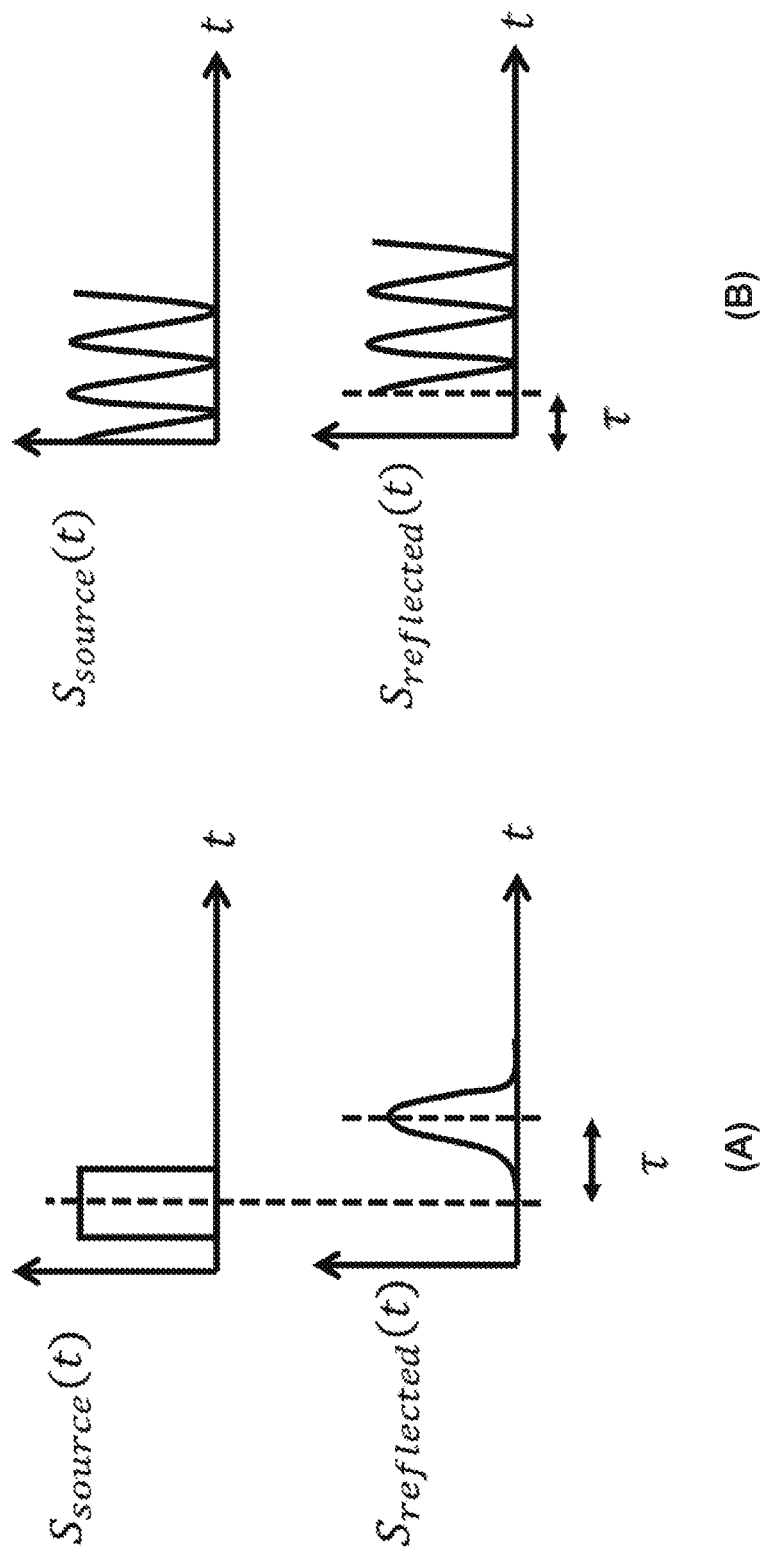
FIG. 1(A) illustrates an example of output from an illumination source of a ToF system as a square pulse as a function of time. The signal corresponding to the square pulse is received after a time delay upon reflection from an object.
FIG. 1(B) illustrates an example of output from an illumination source of a ToF system as a modulated periodic pulse as a function of time. The signal corresponding to the modulated pulse is received after a time delay upon reflection from an object.

Aspects and embodiments of the invention are in the field of optical sensing and imaging. More particularly, aspects and embodiments pertain to polarization sensitive methods, devices and systems that improve the detection, sensing and identification objects using modulated polarized beams. Example applications of the disclosed technology include implementations in time of flight (ToF) sensing or imaging, object recognition, navigation, security, ellipsometry, and characterization of materials.

One aspect of the disclosed technology relates to a polarization sensitive device that includes an illumination source, and a modulator coupled to the illumination source to receive an output beam of the illumination source and to modulate one or more polarization states or polarization parameters of the output to produce a plurality of modulated polarized beams. The above noted device further includes a polarization sensitive detector positioned to receive a reflected portion of the plurality of modulated polarized beams after reflection from an object and to produce electrical signals or information corresponding thereto, and a controller coupled to the polarization sensitive detector to receive and process the electrical signals or the information to enable a determination of a distance between the polarization sensitive device and the object, or a determination of a polarization-specific characteristic of the object. The modulator in some embodiments is configured to modulate the polarization parameters or polarization states without modulating the intensity of the output beam.

Another exemplary aspect of the disclosed embodiments relates to an improved method for detection or sensing an object. The method includes modulating an output beam of an illumination source without modulating the intensity of the output beam to produce a plurality of modulated polarized beams having at least one modulated polarization parameter or polarization state for emission toward the object. The method further includes receiving at least a portion of the plurality of modulated polarized beams reflected from the object at a detector device, and processing signals or information produced by the detector device in response to detection of the received portion of the plurality of modulated polarized beams to determine a polarization state and a modulation parameter of the received portion of the plurality of modulated polarized beams. The method additionally includes determining a distance from the illumination source to the object or a material characteristic of the object based on the determined polarization state and modulation parameter.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Furthermore, in order to facilitate the understanding of the disclosed embodiments, time of flight (ToF) systems are used as examples to illustrate the use of the disclosed technology in a particular application. However, it should be understood that the polarization sensitive methods, devices and systems disclosed herein can be implemented in other systems and applications.

Conventional time of flight (ToF) detectors operate on the principle of RADAR (Radio Detection And Ranging), where the object is illuminated by an active source and a single-bounced reflected light from the object is detected. The distance between the source and the object can be calculated by measuring the delay and/or phase shift of the reflected light. Two common ToF methods are (1) direct pulse modulation and (2) continuous wave modulation. FIG. 1(A) illustrates the basic principles of direct pulse modulation, in which of the light source is on-off modulated in the form of a single pulse that is directed to the object to be imaged or sensed. The reflected pulse is received and the delay, $\tau$, is measured. The distance, d, can be determined by:

$$d = \frac{c\tau}{2}. \tag{1}$$

In Equation (1), c is the speed of light. FIG. 1(B) illustrates the basic principles of continuous wave (CW) modulation, in which the source amplitude is modulated periodically with frequency, $f_s$. The phase difference between the source and reflected light, $\Delta\varphi$, is measured. The distance, d, can determined by:

$$d = \frac{c\Delta\varphi}{4\pi f_s}. \tag{2}$$

Note that in some instances, the phase difference, $\Delta\varphi$, can be greater than $2\pi$, and its exact value can be determined based on the delay, $\tau$, and modulation frequency, $f_s$.

Figure 2:
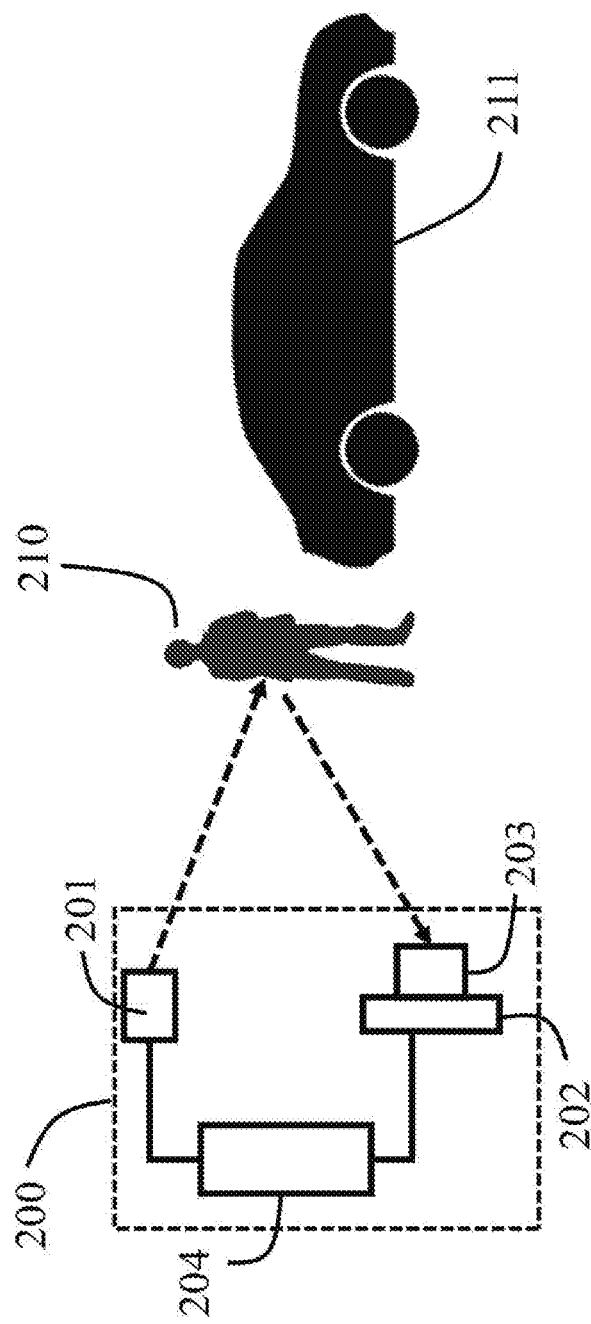
FIG. 2 illustrates an exemplary ToF system.

FIG. 2 illustrates some of the basic components of a typical ToF system 200 that includes a source 201. The source 201, can, for example, be a single or multiple light emitting diode(s) or laser(s). The ToF system 200 also includes a detector or detector array 202, a lens 203, and controller and power source 204. Light is emitted from the source 201, reflected off an object of interest, 210 or 211, and collected by the detector 202. By using a lens 203 and a detector array 202, the object can be imaged. For example, a depth map of the object can be reconstructed that can be used to generate two- and three-dimensional images of the object in real time. For example, such a real time capture and image construction can occur at video rates of 10 to 100 frames per second.

Figure 3:
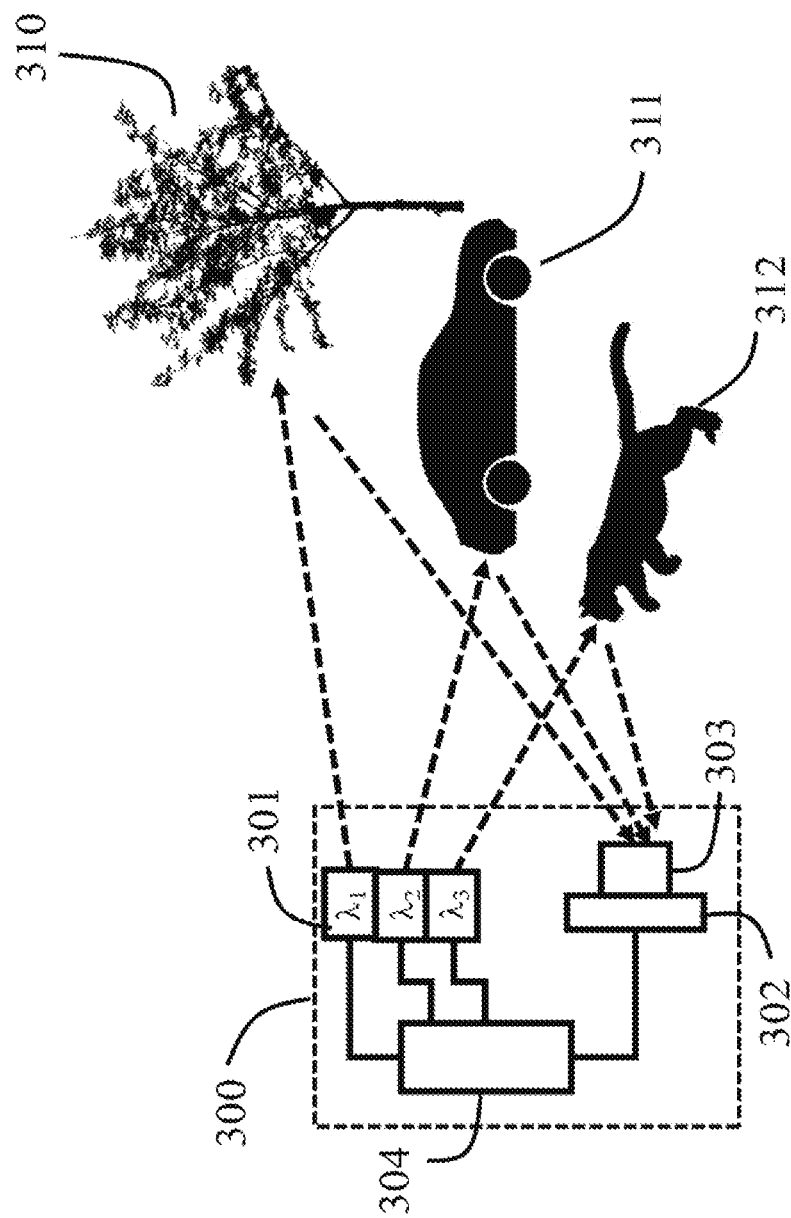
FIG. 3 illustrates an exemplary multi-color ToF system.

FIG. 3 illustrates an example of another ToF system 300 that includes a multi-color light source 301, a color sensitive detector array 302, a lens 303 (such as an achromatic lens), and a controller and power source 304, similar to that shown in FIG. 2. Since different objects can have different reflectivities, the quality of the reflected signal can vary over a large dynamic range for a single color for different objects. For example, a black car can have low reflectance in the visible spectrum and high reflectance in the infrared spectrum. The source 301 can be configured to produce output light having multiple colors, such as visible (e.g., in the range 0.39-0.7 microns), near-infrared (e.g., in the range 0.75-1.4 microns), and short-wavelength infrared (e.g., 1.4-3 microns). In scenarios where the reflectance of the object is known a priori, the wavelengths of the source(s) can be chosen to produce reflected light that can be readily detected. For example, the light source be selected or configured to produce an output beam in the proper range of wavelengths where the reflectance of the object is high. Advantages of this technique include (1) enabling the measurement of objects that have a low reflectivity in one color, (2) providing data redundancy based measurements from multiple colors to achieve higher signal-to-noise ratios, (3) allowing a wider exposure latitude where the reflected signal is saturated in one color and not another, and (4) providing additional information for identification of an object by its reflectance of different colors.

While the use of multi-spectral illumination can provide the above-noted benefits and advantages, image sensing and object detection can be further improved by including additional illumination sources, as well as alternate illumination techniques that are disclosed herein. The disclosed technology use polarization-based illumination and detection techniques that enable the detection/sensing of objects to be carried out faster, cheaper, with higher quality, and can extend the existing range of detection techniques.

To facilitate the understanding of the disclosed technology, it is beneficial to describe some of the basic notations that are used throughout this patent document. The polarization state of light can be described by the Stokes vector S, which consists of the four elements $S_0$, $S_1$, $S_2$, and $S_3$. $S_0$ represents the intensity of an optical field; $S_1$ and $S_2$ denote the affinity towards 0° and 45° linear polarization, respectively; and $S_3$ expresses the difference between right and left circular polarizations. Using S, the angle of linear polarization, $\theta_{linear}$, the degree of polarization (DOP), the degree of linear polarization (DOLP), and the degree of circular polarization (DOCP) can be calculated as follows:

$$\theta_{linear} = \frac{1}{2}\tan^{-1}\frac{S_2}{S_1}, \tag{3a}$$

$$DOP = \sqrt{S_1^2 + S_2^2 + S_3^2}\Big/S_0, \tag{3b}$$

$$DOLP = \sqrt{S_1^2 + S_2^2}\Big/S_0, \tag{3c}$$

$$DOCP = \frac{S_3}{S_0}. \tag{3d}$$

A polarization-based ToF imager can be constructed by modulating the polarization state of the light, e.g., changing the source Stokes vector, S, as a function of time. For simplicity, the following discussion is limited to a source of a single color, although a multi-color multi-polarization source can also be implemented.

Figure 4A:
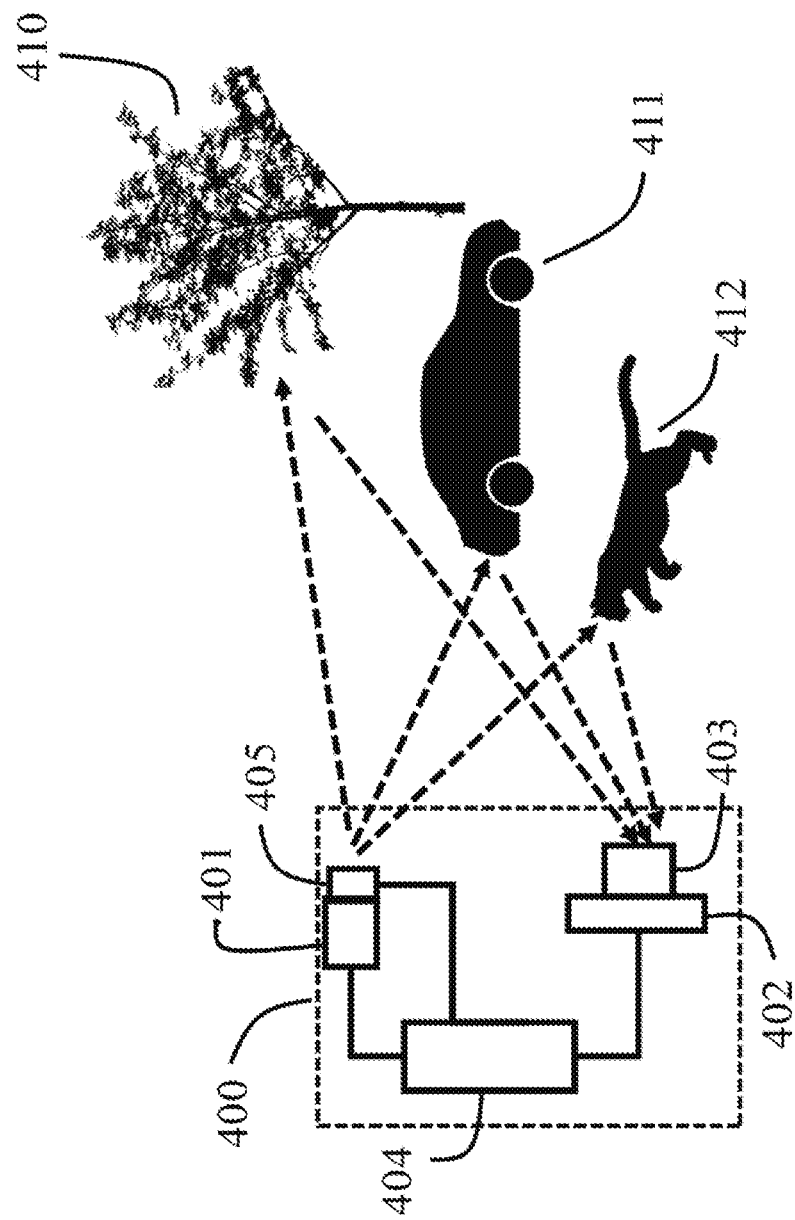
FIG. 4(A) illustrates a polarization sensitive ToF system in accordance with an exemplary embodiment.

FIG. 4(A) illustrates a polarization ToF system in accordance with an exemplary embodiment. The polarization ToF 400 includes a source 401, a polarization sensitive detector or detector array 402, a lens 403, a controller and power source 404, and a polarization modulator 405. In some implementations, the lens 403 can be augmented and/or replaced by a polarization beam splitter and detectors which reduce the optical losses in the system. The polarization ToF system 400 further includes a polarization modulator 405. Non-limiting examples of a polarization modulator include a liquid crystal retarder, a tunable Faraday rotator, a photoelastic modulator, an electro-optic modulator, a magneto-optic modulator, a rotating retarder, or rotating polarizer. The controller can be programmed or configured to control the illumination source 401, the modulator 405, the polarization sensitive detector 402, and/or other components of the ToF system 400 that can be managed or controlled via programmed signals. It should be noted that in some configurations, different controllers or processors may be used to control the illumination subsystem and the detection subsystems. Moreover, the polarization sensitive detector 402 may include its own processing and control components (as, for example, described in connection with FIG. 4(C) below). It is therefore understood that any references to a processor or controller in the singular form can be construed in some embodiments as including multiple controllers or processors. The electrical signals that are produced in response to the detection of light incident on the detector (such as a CMOS sensor, a photomultiplier tube, etc.) are processed to produce detection information corresponding to the incident light, which are further processed to determine the ToF, to measure distance, to assess material properties of the target and perform other types of information processing and analysis.

Figure 4B:
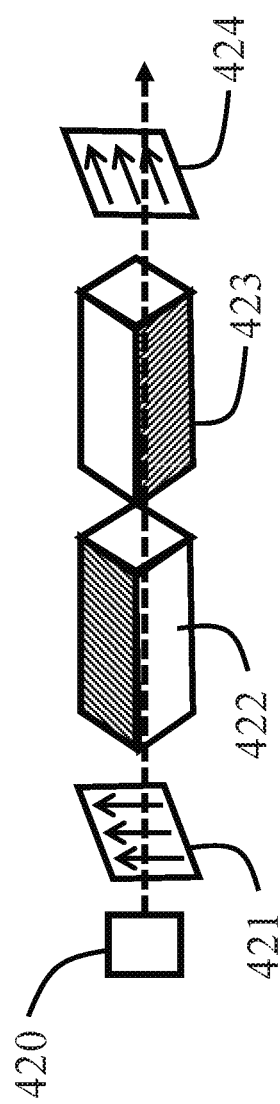
FIG. 4(B) illustrates a modulator for use in a polarization sensitive ToF system in accordance with an exemplary embodiment.

FIG. 4(B) illustrates a polarization modulator in accordance with an exemplary embodiment. The polarization modulator includes a polarized laser source 420 that outputs vertically polarized light 421. The vertically polarized light 421 passes through two electro-optic crystals, 422 and 423, oriented at 45° with respect to the crystal axes, which can operate as a tunable waveplate. The output light 424 is horizontally polarized. The two matched crystals are arranged in series at 90° relative to each other to suppress variations caused by temperature.

In at least some embodiments, the amplitude or intensity of the source is not modulated in time. Thus, compared to systems that use amplitude modulation, the disclosed technology enables a higher power signal to reach and reflect back from the object. This feature can be used to improve the detected image quality (e.g., via an improved SNR) and/or to extend the distance at which an object can be sensed.

Figure 4C:
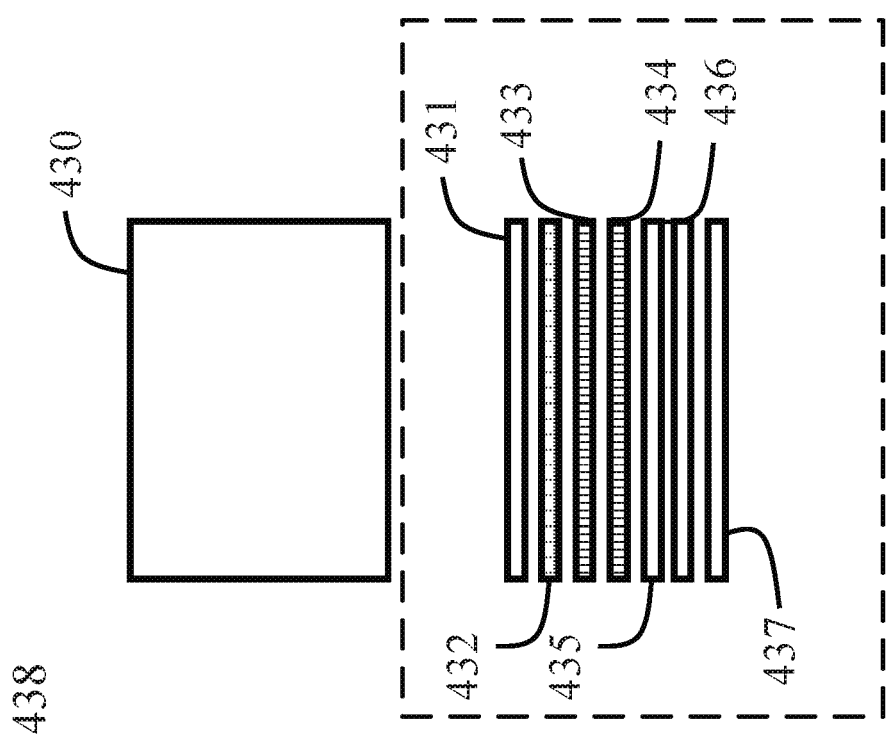
FIG. 4(C) illustrates a polarization and color sensitive imager in accordance with an exemplary embodiment.

Referring back to FIG. 4(A), in general, both the reflectance and the polarization state of light reflected from the object 410, 411, and 412 can be very different. Thus different objects can be distinguished from one another at least based on the detection of different polarization states or polarization parameters. FIG. 4(C) illustrates an example of a polarization sensitive imager or detector 438 that can be used in the ToF polarization system 400 of FIG. 4(A). The imager 438 includes an imaging camera lens 430 that enables the light to from the object/scene to be collected and imaged onto an image sensor 435 (e.g., a CMOS image sensor array). The imager 438 also includes an image signal processor 436, storage memory 437, a polarizer filter array 434, a color filter array 433, a microlens array 432, and an infrared filter 431. The microlens array 432 can be used to improve light collection efficiency or for the purpose of light field imaging. Depending on the application, the microlens array can include a set of multiple microlens arrays of different focal lengths and pitch on top of each other. The infrared filter 431 can be implemented in systems in which the illumination source is in the infrared band; thus the IR filter 431 blocks non-IR components of the reflected light.

It should be noted that, depending on the application and implementation requirements, the imager 438 can include fewer or additional components. For example, some implementations may not include the color filter 433, the microlens array 432 or the infrared filter 431. Moreover, the exemplary detector 438 in FIG. 4(C) is illustrated as implementing some of the components of the detector as layers. The layers can, for example, represent implementation of the components as stacked layers on a single chip. The drawing also shows a gap between the different layers, such gaps may be very small or may not exist in practice. In other implementations, the detector can include discrete or separate components that are coupled together using traditional optical and electrical means.

According to the disclosed embodiments, the Stokes vector can be modulated in various ways to provide polarized light for illumination the object. For example, $\theta_{linear}$, DOP, DOLP, and DOCP can be modulated in time. As illustrated in FIG. 5(A), in some embodiments, the angle of linear polarization is modulated in an on-off manner. In particular, linear polarized light is passed through an electro-optic modulator. For a certain duration of time, the modulator is turned off, such that the output light is also linear polarized and at the same angle as the input light. Next, the modulator is turned on for a predetermined period of time, such that it acts as a half-wave plate. As a result, the polarization state of the output light is rotated by 90 degrees during the predetermined period of time. As shown in the top two plots of FIG. 5(A), the intensities of the illumination source and, thus the reflected light, are constant in time. However, as shown in the third plot in FIG. 5(A), the angle of linear polarization of the source changes as a function of time. The reflected light also exhibits the on-off modulation as depicted in the bottom plot of FIG. 5(A). By measuring the angle of reflected polarized light as a function of time, the delay of the polarized light can be measured and the distance to the object can be calculated, as discussed earlier in this document. It should be noted that while FIG. 5(A) illustrates a single pulse representative of an on-off modulation, it is understood that the angle of linear polarization (as well as other polarization parameters) can be modulated according to any desired modulation, including but not limited to, CW modulation.

Figure 6:
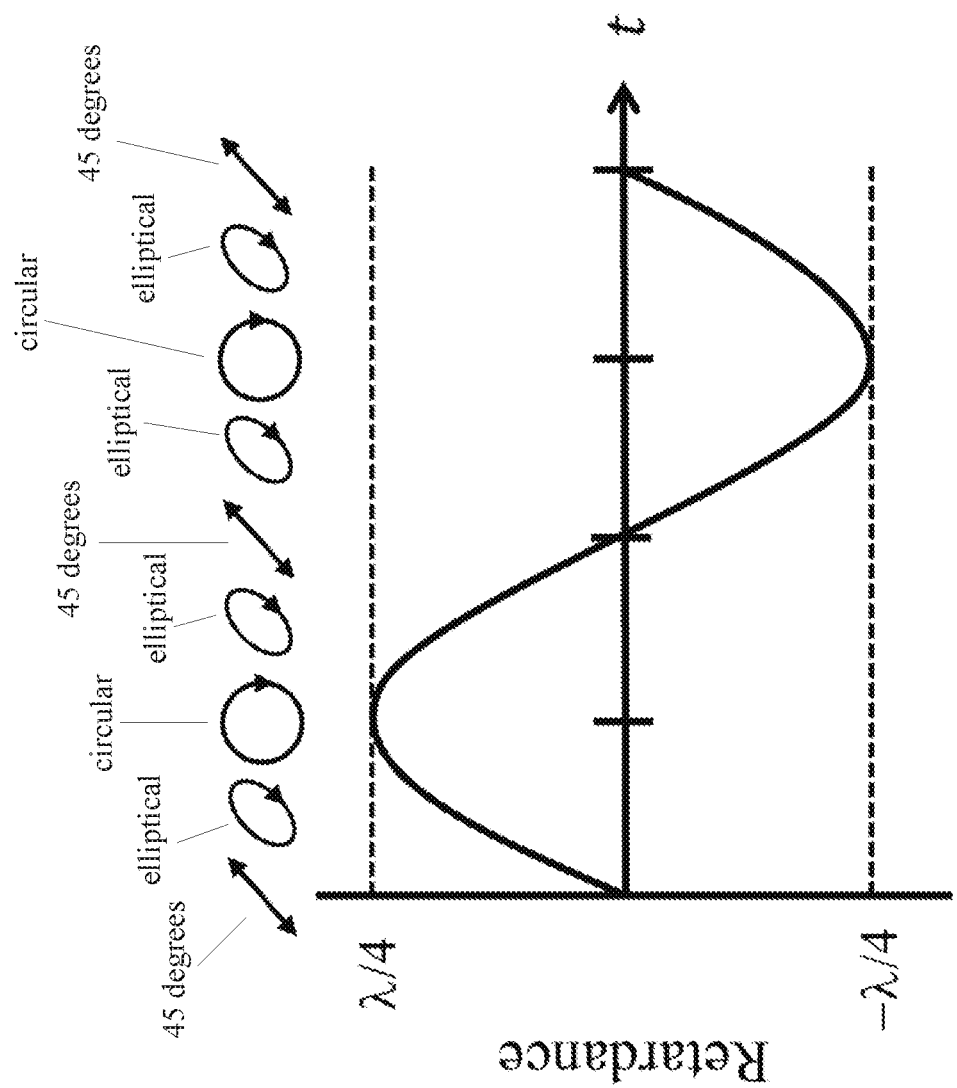
FIG. 6 illustrates the output polarization state of illumination modulated by a photoelastic modulator as a function of time in accordance with an exemplary embodiment.

FIG. 5(B) illustrates modulation of degree of circular polarization in accordance with an exemplary embodiment. In particular, linear polarized light is passed through a modulator, such as a photoelastic modulator. An example of the output of a photoelastic modulator is shown in FIG. 6, illustrating that the polarization state changes from linear, to elliptical and to circular and back to elliptical and to linear. The DOCP goes from zero to one and back to zero. By measuring the DOCP of the reflected light as a function of time, the delay of the reflected light can be measured and the distance can be calculated, as describe earlier in this patent document. Note that the signal can be modulated in sine wave format or any other format, such as but not limited to square wave. The type of modulation shape depends on the specific hardware implementation and availability. Furthermore, other polarization parameters, such as DOP and DOLP can be modulated in a similar fashion. Notably, the polarization can be modulated in a CW fashion, while maintaining a constant intensity of the light source. According to the disclosed embodiments, at least some of the changes in direction of polarization can also be captured through the modulation of polarization parameters. For example, if the laser illumination source output changes from right-handed circular polarization to left-handed circular polarization, the degree of circular polarization changes from −1 to 1. It should be further noted that in FIGS. 5(A) and 5(B), the analysis and processing of the reflected light is carried out after the reflected light has reached the suitable detector. Thus, the terms reflected light and received light are sometimes used interchangeably in this patent document.

In systems that are implemented to conduct depth measurement, the resolution of the measurement can be one factor in determining the type of modulator. For example, depth resolution can be computed using:

$$\text{resolution} = \frac{c}{2f_s} \sqrt{\frac{A}{P_s k_{opt} q_e r T}}. \quad (4)$$

In Equation (4), A is the illuminated area of the object, $P_s$ is optical power of light source, $K_{opt}$ is a constant determined by properties of the optical system, such as lenses, diffusers and pixel size, $q_e$ is the quantum efficiency of the sensor (e.g., a CMOS sensor), T is integration period, and r is reflectivity of the object. Other considerations include power consumption and form factor. Resolution can be improved by increasing the modulation frequency, $f_s$. Currently available photoelastic modulators, such as those made by Hinds Instruments, operate at a nominal frequency of 20 kHz to 84 kHz. Lithium niobate (LiNbO$_3$) electro-optic phase modulators sold by Newport operate from DC to 9.2 GHz. On the other hand, liquid crystal variable retarders, such as those made by Meadowlark Optics operate at about 2 kHz. Depending on the application, a custom modulator can be made that operates from DC to 100s of GHz. The output of the polarized source can be projected by a lens or can be scanned spatially by a moving mirror. Due to the ability to modulate the illumination source at high rates, the disclosed measurements can be repeated multiple times to improve the detection results, and/or detection of moving objects can be readily achieved.

In practice, a polarization sensitive detector includes a light detector and a polarizer that is positioned in front of the light detector. The polarizer can be a linear, circular, or elliptical polarizer. The detector can be a pixelated array of a photonic mixer device, such as those made by PMD Technologies, or a single-photon avalanche diode (SPAD), such as those made by Princeton Lightwave. The polarization change in time is measured as an intensity change in time. The polarization state of the light is deduced by the orientation and type of polarizer. Typically, a minimum of four detectors is used to measure the four components of the Stokes vector. In some applications, it may not be necessary to measure all four components of the Stokes vector. For example, if the source is modulated in two orthogonal polarization states, then a detector that is sensitive to only one of the two orthogonal polarization states may be sufficient. In such a scenario, because of a priori knowledge that two polarization states must be detected at particular time intervals, the detection of one polarization state during the expected time interval can inform the detection of the second polarization state.

For some applications, where the reflectance of the object is polarization dependent, a polarization insensitive detector can be used in the polarization ToF system. In such applications, the polarization dependent reflectance causes the reflected light to be amplitude modulated, which can be detected by a conventional ToF detector. For other applications, accurate measurement of the full Stokes vector of the reflected light may be necessary to provide a high signal-to-noise ratio or to enable identification of the type and shape of the object. In these scenarios, the polarization sensitive detector can be an array of pixelated detectors, for example, a photonic mixer device with micro-lens, micro-polarizer or color filter or combination on top.

FIG. 7(A) shows an exemplary detector array that can be used as part of the disclosed polarization sensitive ToF systems. The detector array 700 includes detector elements 701 having the shape of a square in a square grid configuration. Each element can include one or more detector subarrays. FIG. 7(B) illustrates an example of a two-by-two detector sub-array 710 that includes three linear polarizers 711, 714, 715, and one circular polarizer 712. The sub-array can, for example, be placed on top of element 701. Measurement of light from the four detectors in the sub-array of FIG. 7(B) permits the calculation of all four components of the Stokes vector. Another exemplary two-by-two detector sub-array 720 including four linear polarizers 721, 722, 723, 724 is shown in FIG. 7(C). Measurement of light using the four detectors in the sub-array of FIG. 7(C) permits the calculation of three components of the Stokes vector. Another exemplary two-by-two detector sub-array 730 including four elliptical polarizers 731, 732, 733, 734 is shown in FIG. 7(D). Measurement of light from the four detectors in the sub-array of FIG. 7(D) permits the calculation of all four components of the Stokes vector. Finally, an exemplary two-by-two detector sub-array 740 including four color filters 741, 742, 743, 744 is shown in FIG. 7(E). Measurement of light from the four detectors in the sub-array of FIG. 7(E) permits the ToF detection at four wavelengths, or range of wavelengths, $\lambda_1$, $\lambda_2$, $\lambda_3$ and $\lambda_4$. Depending on the application, sub-arrays of two, three, four, or other number of detectors with different combinations of color filters and polarizers can be employed. Furthermore, the arrangement of the detectors does not have to lie on a square grid.

One application of the disclosed polarization sensitive detection system includes implementations in polarization sensitive light field cameras. Such cameras measure the plenoptic function, which is a record of all available information of a scene along multiple dimensions such as position, angle, wavelength, polarization and time.

Useful data other than measured distances are available from ToF systems. For example, by measurement the polarization state of the reflected light for different states of polarization of the source, all or a portion of the Mueller matrix for the object to be constructed. Thus, the disclosed polarization sensitive ToF systems and methods can effectively be used as a Mueller matrix imaging polarimeter to remotely measure the polarization properties of the object. This information permits more accurate identification and differentiation of materials compared with merely measuring the reflectance at one wavelength. For example, a measurement of a person's face provides not only the three-dimensional structure of the face but also provides detailed polarization signatures of the facial profile. This may be very useful for security (e.g., screening at airports, enabling secured access to a facility, etc.), as well as medical and other applications.

The following provides a brief discussion of the Mueller matrix to facilitate the understanding of the related embodiments. The Mueller matrix of an object, $M_o$, is a 4×4 matrix that relates the input Stokes vector, $S_i$, incident on the object, and the output Stokes vector, $S_o$, that is reflected or transmitted from the object. The Muller matrix is expressed as $$\begin{bmatrix} S_{o,0}(t) \\ S_{o,1}(t) \\ S_{o,2}(t) \\ S_{o,3}(t) \end{bmatrix} = \begin{bmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{bmatrix} \begin{bmatrix} S_{i,0}(t) \\ S_{i,1}(t) \\ S_{i,2}(t) \\ S_{i,3}(t) \end{bmatrix}$$

The matrix is a function of wavelength, angle of incidence, angular bandwidth, and sample location. For the ToF polarization instrument to measure the Mueller matrix, both the input and output Stokes vectors must be known for at least four different times, $t_{0,1,2,3}$. The Stokes vectors at different times can be written as $$\begin{bmatrix} S_{o,0}(t_0) & S_{o,0}(t_1) & S_{o,0}(t_2) & S_{o,0}(t_3) \\ S_{o,1}(t_0) & S_{o,1}(t_1) & S_{o,1}(t_2) & S_{o,1}(t_3) \\ S_{o,2}(t_0) & S_{o,2}(t_1) & S_{o,2}(t_2) & S_{o,2}(t_3) \\ S_{o,3}(t_0) & S_{o,3}(t_1) & S_{o,3}(t_2) & S_{o,3}(t_3) \end{bmatrix} = \begin{bmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{bmatrix}$$

$$\begin{bmatrix} S_{i,0}(t_0) & S_{i,0}(t_1) & S_{i,0}(t_2) & S_{i,0}(t_3) \\ S_{i,1}(t_0) & S_{i,1}(t_1) & S_{i,1}(t_2) & S_{i,1}(t_3) \\ S_{i,2}(t_0) & S_{i,2}(t_1) & S_{i,2}(t_2) & S_{i,2}(t_3) \\ S_{i,3}(t_0) & S_{i,3}(t_1) & S_{i,3}(t_2) & S_{i,3}(t_3) \end{bmatrix}$$

If an inverse exists and the Mueller matrix is slowly varying in time, i.e., the object is not changing and moving rapidly, then $M_o$ can be computed as:

$$\begin{bmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{bmatrix} =$$

$$\begin{bmatrix} S_{o,0}(t_0) & S_{o,0}(t_1) & S_{o,0}(t_2) & S_{o,0}(t_3) \\ S_{o,1}(t_0) & S_{o,1}(t_1) & S_{o,1}(t_2) & S_{o,1}(t_3) \\ S_{o,2}(t_0) & S_{o,2}(t_1) & S_{o,2}(t_2) & S_{o,2}(t_3) \\ S_{o,3}(t_0) & S_{o,3}(t_1) & S_{o,3}(t_2) & S_{o,3}(t_3) \end{bmatrix} \begin{bmatrix} S_{i,0}(t_0) & S_{i,0}(t_1) & S_{i,0}(t_2) & S_{i,0}(t_3) \\ S_{i,1}(t_0) & S_{i,1}(t_1) & S_{i,1}(t_2) & S_{i,1}(t_3) \\ S_{i,2}(t_0) & S_{i,2}(t_1) & S_{i,2}(t_2) & S_{i,2}(t_3) \\ S_{i,3}(t_0) & S_{i,3}(t_1) & S_{i,3}(t_2) & S_{i,3}(t_3) \end{bmatrix}^{-1}$$

Additional measurements at different times can be made to improve signal-to-noise ratio. Once the Mueller matrix is known, the six polarization parameters can be calculated: angle and magnitude of linear retardation, magnitude of circular retardation, angle and magnitude of linear diattenuation, and magnitude of circular diattenuation.

Figure 8:
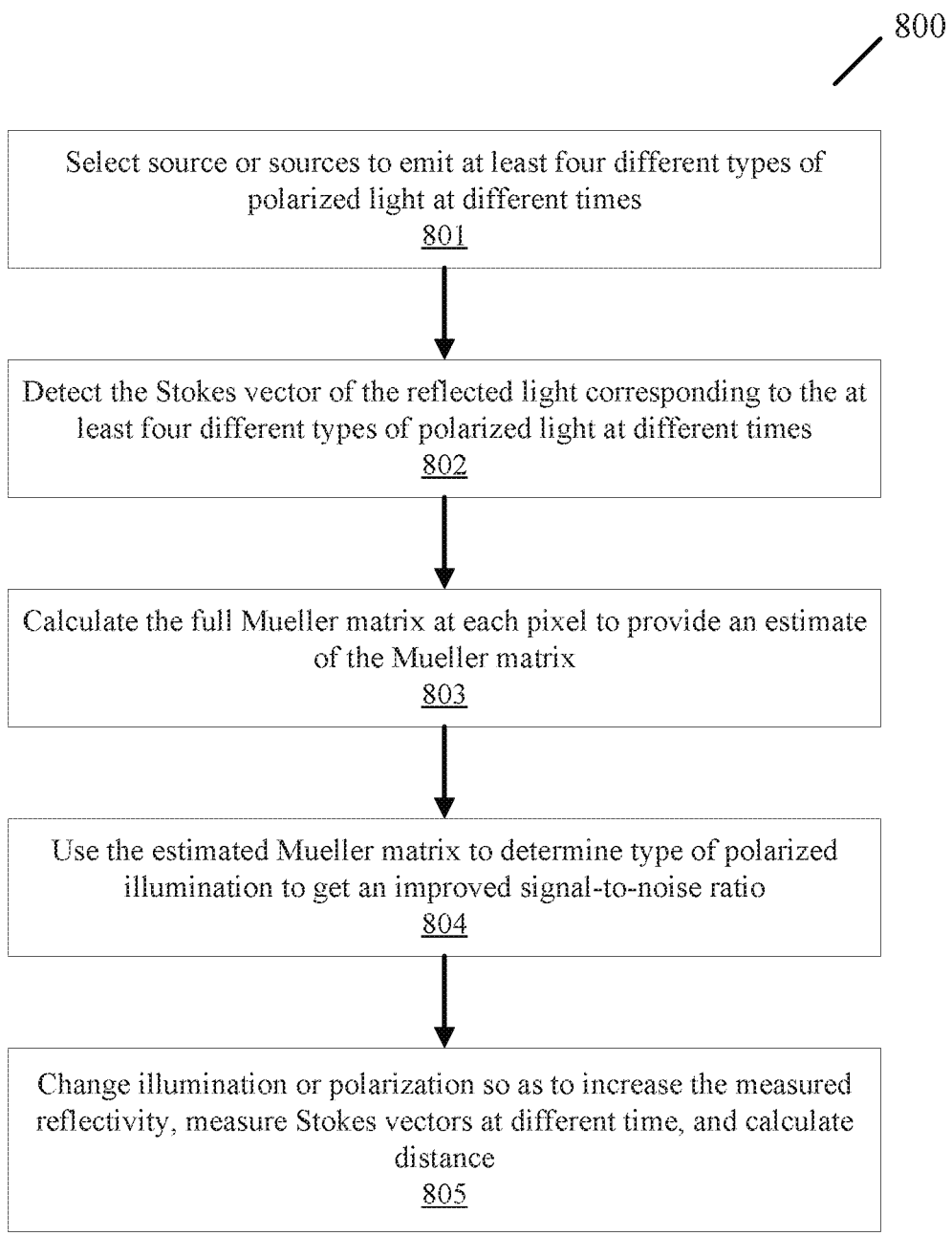
FIG. 8 illustrates a set of exemplary operations that can improve the detection or sensing of an object in accordance with an exemplary embodiment.

In many situations, the information obtained from the Mueller matrix can be used to improve the measurement of distance. For example, if the complete or part of the Mueller matrix of an object is known, the Stokes vector of the illumination can be chosen to maximize the reflected signal and to minimize cross-talk and background noise. FIG. 8 illustrates a set of exemplary operations 800 that can improve the detection or sensing of an object in accordance with an exemplary embodiment. In effect, the exemplary operations 800 measure the full Mueller matrix of the reflector, and then change the illumination to obtain a better-quality distance measurement. More particularly, at 801, the source illumination and modulation is selected to emit at least four different types of polarized light at different times ($S_{i(0, 1,2,3)}$ at $t_0, t_1, t_2, t_3$). For example, with reference to FIG. 4(A), the controller 404 can be programmed or configured to control the light source 401 and the modulator 405 to produce output illumination having the desired polarization states at particular time instants. At 802, the Stokes vector, $S_o$, of the reflected light corresponding to the four different types of polarized light is detected at different times from 801. At 803, the full Mueller matrix is calculated at each pixel of the detector to provide an initial estimate of the Mueller matrix. The Mueller matrix can be used to ascertain the characteristics of the object and/or to form an image of the object. At 804, the estimated Mueller matrix obtained at 803 is used to determine the polarized illumination that provides an improved (e.g., the best achievable) signal-to-noise ratio. At 805, the illumination or polarization is changed according the determination at 804 to increase (e.g., maximize) the measured reflectivity from the object, determine the Stokes vector as a function of time and obtain a high resolution distance measurement. It should be noted that further iterations of operations 802 through 804 can be performed to further improve the distance measurements. As noted earlier, existing modulators can operate in the MHz and even GHz range, and thus such iterations can be readily implemented as part of the disclosed embodiments.

Figure 9:
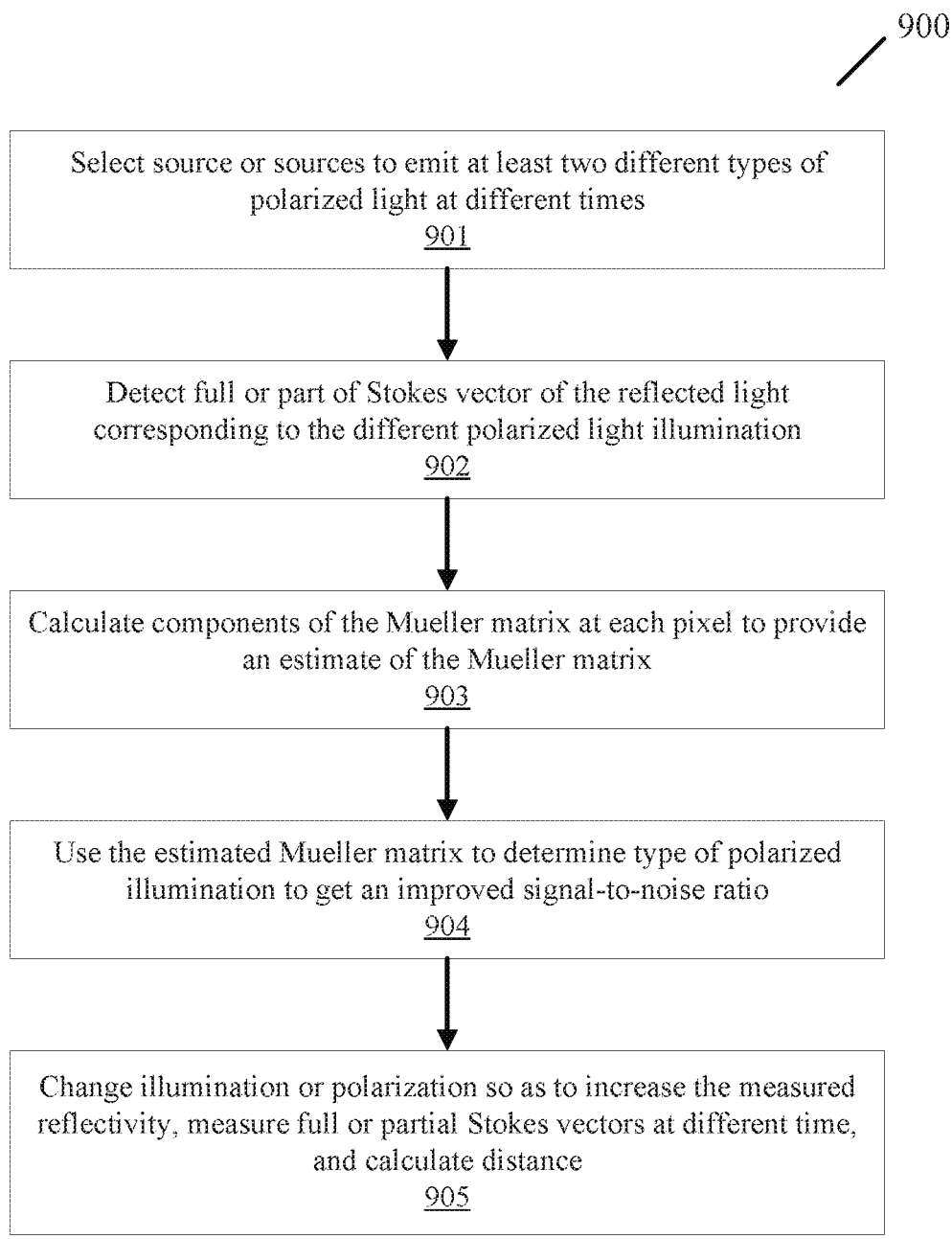
FIG. 9 illustrates another set of exemplary operations that can improve the detection or sensing of an object in accordance with an exemplary embodiment.

FIG. 9 illustrates another set of exemplary operations 900 that can improve the detection or sensing of an object in accordance with an exemplary embodiment. The exemplary operation 900 measure only some of the components of the Mueller matrix instead of the entire matrix. At 901, the source illumination and modulation is selected to emit at least two different types of polarized light at different times. At 902, the full or partial Stokes vector of the reflected light corresponding to the at least two different types of polarized light is detected. At 903, the components of the Mueller matrix are calculated at each pixel of the detector to provide an initial estimate of the Mueller matrix. At 904, the estimated Mueller matrix is used to determine the polarized illumination that provides an improved (e.g., the best achievable) signal-to-noise ratio. At 905, the illumination polarization is changed according the determination at 904 to obtain full or partial Stokes vector components, and to calculate the distance from the object. Similar to the discussion regarding the operations 800 in FIG. 8, operations 902 through 905 can be repeated in several iterations to improve the measurements.

The operations 900 can be especially advantageous when the illumination source cannot generate all of the required Stokes vectors, the detector cannot measure the entire Stokes vector, there is not enough time to generate and measure the full Mueller matrix, and/or the time and cost are at a premium. One example application includes implementation in a 3D camera of a mobile/smart phone or similar device. In such implementations, the fast processors of the mobile device enable high speed modulation of the polarized light source, while the advantages gained by, e.g., utilization of constant amplitude illumination, CW modulation of polarization parameters, and partial Mueller Matrix and/or Stokes vector computations, allow the size, power consumption, and cost of the implementation to be kept low. In one example, in order to speed up and simplify the analysis and data acquisition, the illumination can be selected to have only two polarization states. The detector can also be sensitive to only the two polarization states. Such a system is sometimes referred to as an incomplete polarimeter since the apparatus does not measure the full Mueller matrix and provides incomplete polarization information of the object.

The disclosed embodiments can be implemented in a variety of device and find many applications in the field of illumination, sensing and imaging. Non-limiting examples of such applications include collision avoidance and navigation systems, such as those implemented in unmanned aerial vehicles and automobiles including autonomous cars. In such implementations, the improved object sensing and recognition capabilities can be used to detect obstacles and warn the pilot/driver, and/or to allow the automated navigation system to take the appropriate action. In some applications, the disclosed object sensing and detection techniques may be used to identify facial features and even emotional state of a person to improve safety and well-being of the vehicle operator. For example, it can be determined whether or not the operator has fallen sleep, is in an agitated state, or is otherwise distracted, and to trigger various mitigating actions (e.g., stop the vehicle, play music, sound an alarm, etc.). In yet other applications, the disclosed technology may be used in a scientific, industrial or consumer settings to, for example, enable characterization of various compounds, thin films, or bulk materials (e.g., as in implementations for polarimetry or ellipsometry), as well as in metrology applications to allow measurements of distances, depth and surface profiles, and tolerances. In some applications, polarization techniques can further be used to provide sub-surface imaging of object, such as blood vessels below the skin. As noted earlier, the features of the disclosed technology enable object sensing and identification to be carried out in a faster and cheaper fashion compared to the existing systems. These benefits can be traded off to provide a smaller form factor, an increased accuracy in the measurements and/or reduced computational cycles. Further, as described, for example, in connection with the operations of FIGS. 8 and 9, the modulation of the polarization of the illumination source, collection of reflected light and processing of the collected data can be carried out in one or more iterations and/or with full or partial knowledge of polarization parameters, thereby providing a scalable system which can produce different levels of accuracy, SNR, or object sensing depending on the requirements of the application, or limitations on the cost of implementation.

Figure 10:
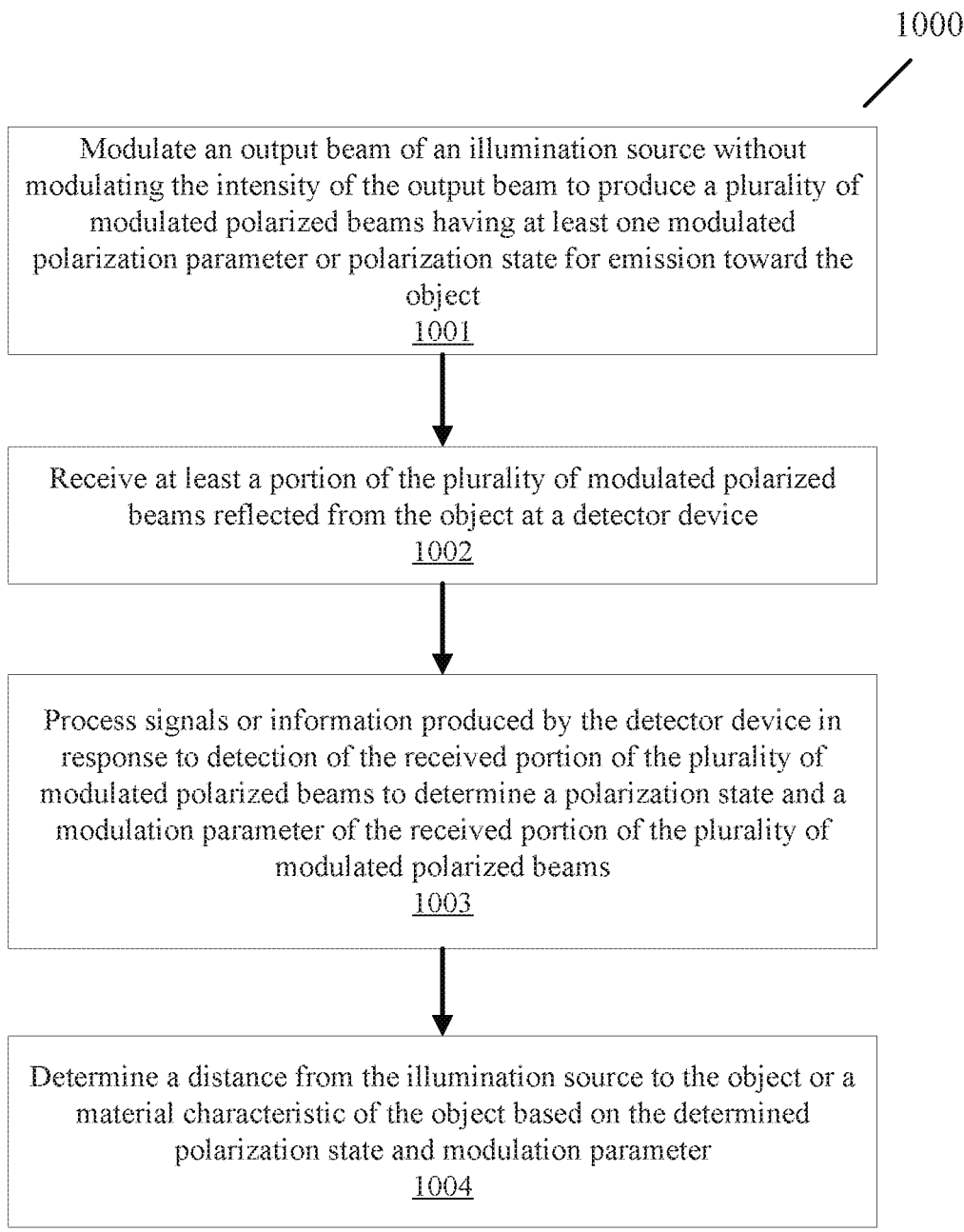
FIG. 10 illustrates a set of exemplary operations for detecting an object in accordance with an exemplary embodiment

FIG. 10 illustrates a set of exemplary operations 1000 for detecting an object in accordance with an exemplary embodiment. Specifically, at 1001, an output beam of an illumination source is modulated without modulating the intensity of the output beam to produce a plurality of modulated polarized beams having at least one modulated polarization parameter or polarization state for emission toward the object. At 1002, at least a portion of the plurality of modulated polarized beams that are reflected from the object is received at a detector device. At 1003, signals or information produced by the detector device in response to detection of the received portion of the plurality of modulated polarized beams are processed to determine a polarization state and a modulation parameter of the received portion of the plurality of modulated polarized beams. At 1004, a distance from the illumination source to the object or a material characteristic of the object is determined based on the determined polarization state and modulation parameter.

In some embodiments, the at least one polarization parameter of the modulated polarized beams produced by the modulating the illumination source includes one or more of: an angle of linear polarization, a degree of polarization, a degree of circular polarization, or a degree of elliptical polarization. In some embodiments, the modulated polarized beams have Stokes vector values that change as a function of time. In one embodiment, processing the signals or information produced by the detector device includes determining at least one of: an angle of linear polarization, a degree of polarization, a degree of circular polarization, or a degree of elliptical polarization of the received portion of the plurality of modulated polarized beams. In still another embodiment, processing the signals or information produced by the detector device includes determination of Stokes vector values associated with the received portion of the plurality of modulated polarized beams. In yet another embodiment, processing the information or signals produced by the detector device includes determining a value corresponding to one or more of the following: a linear polarization at a particular angle, a left-handed circular polarization, a right-handed circular polarization, a left-handed elliptical polarization or a right-handed elliptical polarization.

In one embodiment, the above noted method further includes filtering the output beam of the illumination source to produce a spectrally-modified illumination for emission toward the object, and processing the signals or information includes determination of a value of spectral components of light that is received at the detector device. According to another embodiment, modulating the output beam of the illumination source includes using a photoelastic modulator to produce at least one of the modulated polarized beams. In yet another embodiment, determining the distance, d, includes computing $$d = \frac{c\Delta\varphi}{4\pi f_s},$$

where c is the speed of light, $f_s$ is a modulation frequency of a polarization parameter, $\Delta\varphi$ is a phase difference between the polarization parameter waveform at the modulator output and at the detector device.

In another embodiment, modulating the illumination source includes producing at least four different types of polarized light at four time instances, processing the signals or information includes determining a Stokes vector associated with the four different types of polarized light, and computing an estimate of a Mueller matrix. In this embodiment, the method for detecting the object further includes modifying the polarization state or polarization parameter based on the estimate of the Mueller matrix.

In still another embodiment, modulating the illumination source includes producing at least two different types of polarized light at two time instances, processing the signals or information includes determining at least a partial Stokes vector associated with the two different types of polarized light, and to computing an estimate of at least a partial Mueller matrix. In this embodiment, the method for detecting the object further includes modifying the polarization state or polarization parameter of the modulated polarized beams based on the estimate of the Mueller matrix for emission toward the object.

In another embodiment, the above noted method for detecting an object includes determining a depth or spatial profile of the object. In still another embodiment, the method includes determining a materials property of object.

Another aspect of the disclosed embodiments relates to a polarization sensitive device that includes an illumination source, a modulator coupled to the illumination source to receive an output beam of the illumination source and to modulate one or more polarization states or polarization parameters of the output to produce a plurality of modulated polarized beams. The device further includes a polarization sensitive detector positioned to receive a reflected portion of the plurality of modulated polarized beams after reflection from an object and to produce electrical signals or information corresponding thereto, and a controller coupled to the polarization sensitive detector to receive and process the electrical signals or information to enable a determination of a distance between the polarization sensitive device and the object, or a determination of a polarization-specific characteristic of the object.

In some embodiments, the modulator is configured to modulate one or more polarization parameters of the output beam without modulating an intensity of the output beam. In one embodiment, the one or more polarization parameters include one or more of: an angle of linear polarization, a degree of polarization, a degree of circular polarization, or a degree of elliptical polarization. In another embodiment, the modulated polarized beams have Stokes vector values that change as a function of time. In yet another embodiment, the polarization sensitive detector includes a polarization filter and a semiconductor detector, where the polarization filter is positioned to receive the reflected portion of the plurality of modulated polarized beams and to provide a filtered light to the semiconductor detector. For example, the polarization filter can include a plurality of sub-arrays, each sub-array including at least two polarizer elements and each polarizer element allowing one state of polarized light to pass therethrough. In one specific example, the polarizer element includes any one of: a linear polarizer with a particular angle of linear polarization, a left-handed circular polarizer, a right-handed circular polarizer, a left-handed elliptical polarizer or a right-handed elliptical polarizer.

According to one embodiment, the polarization sensitive detector includes a semiconductor detector and a color filter positioned to receive the reflected portion of the plurality of modulated polarized beams and to provide a spectrally filtered light to the semiconductor detector. In particular, the color filter can include a plurality of sub-arrays, each sub-array including at least two elements and each element allowing only a portion of spectral contents of light that is incident thereupon to pass therethrough. In still another embodiment, the polarization sensitive detector includes a semiconductor detector array, a polarization filter array and a microlens array positioned to allow the reflected portion of the plurality of modulated polarized beams received by at the polarization sensitive detector to pass through the lens array and through the polarization filter before reaching the semiconductor detector.

In some embodiment, the modulator includes a photoelastic modulator configured to produce an output polarization that changes from linear polarization, to elliptical polarization and to circular polarization as a function of time. In yet another embodiment, the polarization sensitive device further includes a lens positioned to receive the reflected portion of the plurality of modulated polarized beams and direct the reflected portion of the plurality of modulated polarized beams to the polarization sensitive detector. In still another embodiment, the output beam of the illumination source includes light in the infrared range of wavelengths, and the polarization sensitive detector includes an infrared filter.

According to another embodiment, the controller of the polarization sensitive device includes a non-transitory memory with instructions stored thereupon, where the instructions when executed by the controller configure the controller to compute the distance between the polarization sensitive device and the object based at least on the electrical signals or information. In one embodiment, the controller is configured to control one or both of: the illumination source or the modulator. In another embodiment, the instructions when executed by the controller configure the controller to control the illumination source or the modulator to emit at least four different types of polarized light at four time instances, process the electrical signals or the information produced by the polarization sensitive detector to obtain a Stokes vector associated with the four different types of polarized light, and to compute an estimate of a Mueller matrix, and control the illumination source or the modulator to modify the one or more polarization states or polarization parameters based on the estimate of the Mueller matrix. In yet another embodiment, the instructions when executed by the controller configure the controller to control the illumination source or the modulator to emit at least two different types of polarized light at two time instances, process the electrical signals or the information produced by the polarization sensitive detector to obtain at least a partial Stokes vector associated with the two different types of polarized light, and to compute an estimate of at least a partial Mueller matrix, and control the illumination source or the modulator to modify the one or more polarization states or polarization parameters based on the estimate of the Mueller matrix.

In some embodiments, the above noted polarization sensitive device of claim 1, wherein the device is part of 3-dimensional imaging camera. In some embodiments, controller is configured to determine a depth or spatial profile of the object. In yet another embodiment, the controller is configured to determine a materials property of the object.

Another aspect of the disclosed embodiments relates to an apparatus that includes means for modulating light from an illumination source to produce a plurality of modulated polarized beams having one or more modulated polarization states or polarization parameters. The apparatus further includes means for detecting a reflected portion of the plurality of modulated polarized beams after reflection from an object and for producing electrical signals or information corresponding thereto. Additionally, the apparatus includes means for receiving and processing the electrical signals or information. In some embodiments, the apparatus further includes means for determining a distance between the polarization sensitive device and the object, or means for determining a polarization-specific characteristic of the object.

One example embodiment of the disclosed technology is a polarization ToF apparatus that includes an illumination source, a polarization modulator disposed to receive and modulate the illumination source output, polarization sensitive detector disposed to receive light reflected from an object being measured, a lens operatively coupled with the detector disposed in a path of the reflected light, and a controller operatively coupled to the detector, the illumination source, and the modulator. In such a polarization ToF apparatus, the polarization sensitive detector can include a polarization and color sensitive detector array including an infrared filter, a microlens array, a color filter array, a polarization filter array, an image sensor, an image processor, and memory storage. Moreover, in such a polarization ToF apparatus, the polarization modulator can be adapted to modulate at least one of a parameter of a polarization state and a plurality of polarization states as a function of time.

One method for making a ToF measurement in accordance with the disclosed embodiments includes measuring both a degree of polarization parameter and a polarization state of light reflected from an object, as a function of time. Another method in accordance with the disclosed embodiments includes making a distance measurement of an object that may be stationary or moving. Such a method includes generating at least two different polarization states of a source illumination at different times, illuminating the object with the source illumination, determining at least part of the Stokes vector of the reflected light from the object corresponding to the different polarized light illumination states, determining at least some of the components of the Mueller matrix of the object to form an image of the object, using the determined at least some of the components of the Mueller matrix of the object to modify a polarization parameter of the source illumination to optimize the detected reflectance from the object, and determining at least part of the Stokes vector of the optimized reflected light from the object to obtain the distance measurement of the object.

The above method can further include generating at least four different polarization states of the source illumination at different times, determining the full Stokes vector of the reflected light from the object corresponding to the four different polarized light illumination states, determining the full Mueller matrix of the object to form the image of the object, using the determined full Mueller matrix of the object to modify a polarization parameter of the source illumination to optimize the detected reflectance from the object, and determining the full Stokes vector of the optimized reflected light from the object to obtain the distance measurement of the object.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Some of the components of the disclosed devices or modules can be implemented as hardware, software, or combinations thereof. For example, a hardware implementation of electronic components can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A polarization sensitive device, comprising:
   an illumination source;
   a modulator coupled to the illumination source to receive an output beam of the illumination source and to modulate one or more polarization states or polarization parameters of the output to produce a plurality of modulated polarized beams;
   a polarization sensitive detector positioned to receive a reflected portion of the plurality of modulated polarized beams after reflection from an object and to produce electrical signals or information corresponding thereto; and
   a controller coupled to the polarization sensitive detector to receive and process the electrical signals or information to enable a determination of a distance between the polarization sensitive device and the object, or a determination of a polarization-specific characteristic of the object; wherein:

the controller includes a non-transitory memory with instructions stored thereupon, wherein the instructions when executed by the controller configure the controller to:
control the illumination source or the modulator to emit at least two different types of polarized light at two time instances,
process the electrical signals or the information produced by the polarization sensitive detector to obtain at least a partial Stokes vector associated with the two different types of polarized light, and to compute an estimate of at least a partial Mueller matrix, and
control the illumination source or the modulator to modify the one or more polarization states or polarization parameters based on the estimate of at least the partial Mueller matrix.

2. The polarization sensitive device of claim 1, wherein the modulator is configured to modulate one or more polarization parameters of the output beam without modulating an intensity of the output beam.

3. The polarization sensitive device of claim 1, wherein the one or more polarization parameters include one or more of: an angle of linear polarization, a degree of polarization, a degree of circular polarization, or a degree of elliptical polarization.

4. The polarization sensitive device of claim 1, wherein the polarization sensitive detector includes a polarization filter and a semiconductor detector, wherein the polarization filter is positioned to receive the reflected portion of the plurality of modulated polarized beams and to provide a filtered light to the semiconductor detector.

5. The polarization sensitive device of claim 4, wherein the polarization filter includes a plurality of sub-arrays, each sub-array including at least two polarizer elements and each polarizer element allowing one state of polarized light to pass therethrough.

6. The polarization sensitive device of claim 5, wherein the polarizer element includes any one of: a linear polarizer with a particular angle of linear polarization, a left-handed circular polarizer, a right-handed circular polarizer, a left-handed elliptical polarizer or a right-handed elliptical polarizer.

7. The polarization sensitive device of claim 1, wherein the polarization sensitive detector includes a semiconductor detector and a color filter positioned to receive the reflected portion of the plurality of modulated polarized beams and to provide a spectrally filtered light to the semiconductor detector.

8. The polarization sensitive device of claim 7, wherein the color filter includes a plurality of sub-arrays, each sub-array including at least two elements and each element allowing only a portion of spectral contents of light that is incident thereupon to pass therethrough.

9. The polarization sensitive device of claim 1, wherein the polarization sensitive detector includes a semiconductor detector array, a polarization filter array and a microlens array positioned to allow the reflected portion of the plurality of modulated polarized beams received by at the polarization sensitive detector to pass through the microlens array and through the polarization filter array before reaching the semiconductor detector array.

10. The polarization sensitive device of claim 1, wherein the modulator includes a photoelastic modulator configured to produce an output polarization that changes from linear polarization, to elliptical polarization and to circular polarization as a function of time.

11. The polarization sensitive device of claim 1, wherein the instructions when executed by the controller configure the controller to compute the distance between the polarization sensitive device and the object based at least on the electrical signals or information.

12. The polarization sensitive device of claim 11, wherein the distance, d, is computed according to the following relationship:

$$d = \frac{c\Delta\varphi}{4\pi f_s},$$

where c is the speed of light, $f_s$ is a modulation frequency of a polarization parameter, $\Delta\varphi$ is a phase difference between the polarization parameter waveform at the modulator and at the at the polarization sensitive detector.

13. The polarization sensitive device of claim 1, wherein the instructions when executed by the controller configure the controller to:
control the illumination source or the modulator to emit at least four different types of polarized light at four time instances,
process the electrical signals or the information produced by the polarization sensitive detector to obtain a Stokes vector associated with the four different types of polarized light, and to compute an estimate of a Mueller matrix, and
control the illumination source or the modulator to modify the one or more polarization states or polarization parameters based on the estimate of the Mueller matrix.

14. A method for detection of an object, comprising:
modulating an output beam of an illumination source without modulating the intensity of the output beam to produce a plurality of modulated polarized beams having at least one modulated polarization parameter or polarization state for emission toward the object;
receiving at least a portion of the plurality of modulated polarized beams reflected from the object at a detector device;
processing signals or information produced by the detector device in response to detection of the received portion of the plurality of modulated polarized beams to determine a polarization state and a modulation parameter of the received portion of the plurality of modulated polarized beams; and
determining a distance from the illumination source to the object or a material characteristic of the object based on the determined polarization state and modulation parameter, wherein:
modulating the output beam of the illumination source includes producing at least two different types of polarized light at two time instances,
processing the signals or information includes determining at least a partial Stokes vector associated with the two different types of polarized light, and to computing an estimate of at least a partial Mueller matrix, and
modifying the polarization state or polarization parameter of the modulated polarized beams based on the estimate of at least the partial Mueller matrix for emission toward the object.

15. The method of claim 14, wherein the at least one polarization parameter of the modulated polarized beams produced by modulating the output beam of the illumination source includes one or more of: an angle of linear polarization, a degree of polarization, a degree of circular polarization, or a degree of elliptical polarization.

16. The method of claim 14, wherein the modulated polarized beams have Stokes vector values that change as a function of time.

17. The method of claim 14, processing the signals or information produced by the detector device includes determining at least one of: an angle of linear polarization, a degree of polarization, a degree of circular polarization, or a degree of elliptical polarization of the received portion of the plurality of modulated polarized beams.

18. The method of claim 14, wherein processing the information or signals produced by the detector device includes determining a value corresponding to one or more of the following: a linear polarization at a particular angle, a left-handed circular polarization, a right-handed circular polarization, a left-handed elliptical polarization or a right-handed elliptical polarization.

19. The method of claim 14, further including filtering the output beam of the illumination source to produce a spectrally-modified illumination for emission toward the object, wherein processing the signals or information includes determination of a value of spectral components of light that is received at the detector device.

20. The method of claim 14, wherein determining the distance, d, includes computing $$d = \frac{c\Delta\varphi}{4\pi f_s},$$

where c is the speed of light, $f_s$ is a modulation frequency of a polarization parameter, $\Delta\varphi$ is a phase difference between the polarization parameter waveform at modulator output and at the at the detector device.

21. The method of claim 14, wherein:

modulating the output beam of the illumination source includes producing at least four different types of polarized light at four time instances, processing the signals or information includes determining a Stokes vector associated with the four different types of polarized light, and computing an estimate of a Mueller matrix, and wherein the method further includes modifying the polarization state or polarization parameter based on the estimate of the Mueller matrix.

22. The polarization sensitive device of claim 1, further comprising a lens positioned to receive the reflected portion of the plurality of modulated polarized beams and direct the reflected portion of the plurality of modulated polarized beams to the polarization sensitive detector.

23. The polarization sensitive device of claim 1, wherein the output beam of the illumination source includes light in the infrared range of wavelengths, and the polarization sensitive detector includes an infrared filter.

24. The method of claim 14, further including determining a depth or spatial profile of the object.

* * * * *